United States Patent
Borngräber et al.

(10) Patent No.: US 7,292,916 B2
(45) Date of Patent: Nov. 6, 2007

(54) METHOD FOR OPERATION OF A VEHICLE AND CORRESPONDING DEVICE

(75) Inventors: Ralf Borngräber, Wolfsburg (DE); Hans-Joachim Frohne, Lehre (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 140 days.

(21) Appl. No.: 11/237,514

(22) Filed: Sep. 27, 2005

(65) Prior Publication Data

US 2006/0071555 A1  Apr. 6, 2006

Related U.S. Application Data

(63) Continuation of application No. PCT/EP2004/000835, filed on Jan. 30, 2004.

(30) Foreign Application Priority Data

Apr. 2, 2003   (DE) .................... 103 15 023

(51) Int. Cl.
*G06F 7/00* (2006.01)
(52) U.S. Cl. .................... 701/1; 701/36; 307/10.3; 307/10.6
(58) Field of Classification Search ............ 701/1, 701/36; 340/5.1, 5.2, 5.21, 5.22, 5.26; 307/10.2–10.7
See application file for complete search history.

(56) References Cited

U.S. PATENT DOCUMENTS 6,479,908 B1 * 11/2002 Utter et al. ............... 307/10.3

6,776,016 B1   8/2004 Wittwer et al. ............... 70/252
7,157,874 B2 * 1/2007 Nomura et al. ............. 318/432
7,158,014 B2 * 1/2007 Lahr et al. .................. 340/433

FOREIGN PATENT DOCUMENTS

| CA | 974313 | 9/1975 | ................. 340/125 |
| CN | 1370120 A | 9/2002 | |
| DE | 19507154 | 10/1995 | |
| DE | 19853075 | 5/2000 | |
| DE | 19939733 | 3/2001 | |
| DE | 19939733 A1 | 3/2001 | |

OTHER PUBLICATIONS

International Search Report PCT/EP2004/000835, 8 pages, mailing date Jan. 30, 2004.
International PCT Search Report Application No. PCT/EP2004/0008335, 13 pages, mailed Mar. 24, 2004.
Chinese Office Action for PCT Application No. 200480003193.0 (4 pages), Oct. 13, 2006.

* cited by examiner

*Primary Examiner*—Richard M. Camby
(74) *Attorney, Agent, or Firm*—Baker Botts L.L.P.

(57) ABSTRACT

An engine (9) of a vehicle (1) is started by first inserting an ignition key (3) into an ignition lock (2) of the vehicle (1). The vehicle (1) can be started by merely pressing the inserted ignition key, whereby said ignition key (3) is further inserted into the ignition lock (2) and takes in a nearly flush position with a dashboard (4) within which the ignition lock is disposed when the motor runs such that the ignition key (3) does not constitute a potential hazard in the event of an accident. The engine (9) is stopped by once again pressing the ignition key (3). Once the engine (9) has been stopped, the ignition key (3) is brought into a position in which the same can be simply removed from the ignition lock (2) by the driver.

12 Claims, 3 Drawing Sheets a)  b)  c)

METHOD FOR OPERATION OF A VEHICLE AND CORRESPONDING DEVICE

CROSS-REFERENCE TO RELATED-APPLICATIONS

This application is a continuation of co-pending International Application No. PCT/EP2004/000835 filed Jan. 30, 2004, which designates the United States of America, and claims priority to German application number 103 15 023.4 filed Apr. 2, 2003, the contents of which are hereby incorporated by reference in their entirety.

TECHNICAL FIELD

The present invention concerns a method for operation of a vehicle and a device with a control, configured according to the method, which can be used, especially for starting an engine of a vehicle.

BACKGROUND

In most cases nowadays, an ignition key is inserted into a key receptacle, generally called an ignition lock, to start an engine of a vehicle. By rotating the inserted ignition key in the key receptacle into a first position, the steering wheel lock is generally unlocked, any immobilizer is deactivated and electrical equipment (for example, radio, air conditioner) is supplied with electrical current from the power supply of the vehicle. By further rotation of the inserted ignition key in the key receptacle into a second position, a starter of the vehicle is generally activated, so that the engine of the vehicle is started. To stop the running engine, the ignition key is generally rotated back in the key receptacle over the first position. During the aforementioned rotations, the axis of rotation is usually perpendicular to a dashboard, in which the key receptacle is arranged.

In order to start an engine of a vehicle in the usual method just described, part of the ignition key protrudes from the dashboard at least with the engine running, which can lead to injuries, for example, in the knee area of the driver, during an accident.

In addition, keyless-go and keyless-entry systems are known in higher priced vehicles, in which a radio transmitter, which the authorized operator of the vehicle carries with him, emits a corresponding radio signal that is recognized by a radio receiver of the vehicle. On receipt of the radio signal, the vehicle is placed in a condition in which an engine of the vehicle can be started and stopped with a key ("start/stop key").

An ignition lock to accommodate an ignition key is known from Patent DE 195 07 154 C2, in which the axis of rotation, around which the ignition key is rotated, lies in the plane of the dashboard. Because of this, the ignition key is recessed into the dashboard when the engine is running, so that the hazard of injury from the protruding ignition key is ruled out.

Even in the ignition lock according to Patent DE 195 07 154 C2, as well as in the now generally common method described further above, the ignition key must be rotated, for example, to start the engine. This requires difficult handling, since, for example, the ignition key must first be correctly inserted (for example, far enough), before it can be rotated. In addition, an ignition lock in which the ignition key must be rotated requires a relatively complex mechanism. A contact system of the ignition lock, in which the ignition key must be rotated, is also unreliable, since a rotational movement is required. In addition, the ignition lock in which the ignition key must be rotated requires a relatively large space, which means an inflexible configuration of the interior.

SUMMARY

The underlying task of the invention is therefore to provide a method, as well as a device, for operation of the vehicle, in which the problems just described, which are connected with rotation of an ignition key, are avoided, in which the ignition key is to be situated in a position when the engine is running so that, during an accident, no hazard of injury from the ignition key exists.

This task can be solved according to the invention by A method for operating of a vehicle, comprising the steps of inserting an ignition key to a first insertion position in a key receptacle, in which an operating state is in a first state, and if the operating state is in the first state, reaching a second state by further insertion of the ignition key up to a second insertion position, wherein an engine of the vehicle is started in the second state.

If the operating state is in the second state, a third state can be reached by releasing the ignition key, so that the ignition key is pushed to a third position. If the operating state is in the third state, a fourth state of the operating state can be reached by reinsertion of the ignition key, in which the engine is stopped during the transition from third state to the fourth state. During insertion of the ignition key to the first position starting from an initial state, the operating state passes through the fourth state, in which the engine is stopped before it reaches the first state. During a transition from the initial state to the fourth state, an immobilizer and a steering wheel lock of the vehicle can be deactivated and a power supply of at least one electrical unit of the vehicle can be activated, and during the transition from the fourth state to the initial state, the immobilizer of vehicle and a steering wheel lock of vehicle can be activated and the power supply of at least one electrical unit of vehicle can be deactivated. During a transition from the fourth state to the first state, a power supply of at least one electrical unit of vehicle can be activated, and during a transition from the first state to the fourth state, the power supply of at least one electrical unit of vehicle can be deactivated.

The object can also be solved by a device for operation of a vehicle comprising a key receptacle for insertion of a ignition key comprising a plurality of insertion positions, control means operable to assume a plurality of operating states, and means for recording the position of the ignition key in the key receptacle, wherein the control means recognize whether the ignition key has been inserted to a first position, in which said control means assume a first state only by insertion up to the first position, and if the control means are in the first state and recognize that the ignition key has been pushed further to a second position, the control means assume a second state, in which the controller means starts an engine of the vehicle.

If the control means is in the second state, a third state can be reached by releasing the ignition key. If the control means is in the third state and recognizes that the ignition key has been re-inserted from a third position to said second position, the control means may assume a fourth state, in which the control means stop the engine when transitioning from the third state to the fourth state. During insertion of the ignition key to the first position, starting from an initial state, the control means may first pass through a fourth state. The control means, when in the fourth state, may deactivate an immobilizer and a steering wheel lock of vehicle and activates a power supply of at least one electrical unit of the vehicle. The control means, when in the first state, may activate a power supply of at least one electrical unit of vehicle. The key receptacle can be arranged in a dashboard and the ignition key may protrude no more than 2 mm from the dashboard when in the third position. The key receptacle may push the ignition key during transition from the third state into the fourth state, so that the front part of the ignition key is situated in a fourth position. The fourth position can be chosen, so that the ignition key protrudes no more than 3 cm from a dashboard. The ignition key can be mounted on the key receptacle. The control means can be coupled to a radio receiver and the control means reaches the first state as soon as the radio receiver receives a corresponding radio signal if the control means are in an initial state, and that the control means, if in the first state, switch to the initial state if a corresponding radio signal is not received in a specified time interval. The fourth and first state can be combined.

In the context of the present invention, an engine of a vehicle is started by the fact that an ignition key is first inserted into an ignition lock of the vehicle, so that a steering wheel lock and an immobilizer can be deactivated and electrical equipment (for example, radio, air condition) can be supplied with electric current from a power supply of the vehicle. By pushing the ignition key, so that it is introduced further into the ignition lock, the vehicle can be started. The ignition key then assumes an almost flush position with a surface of the ignition lock with the engine running so that, during an accident, no hazard of injury results from the ignition key.

In a preferred variant of the present invention, the engine is stopped by pressing the ignition key again, so that the ignition key is introduced even further into the ignition lock. The ignition lock, after the motor has been stopped, can then be brought into a position, so that it can be simply removed by the driver of the vehicle from the ignition lock-;

In comparison with an ordinary ignition lock, the ignition lock according to the invention has simpler handling, since the ignition key need not be rotated, but only inserted. The contact system of the ignition lock according to the invention, in comparison with an ordinary ignition lock, is also more reliable, since no rotational movement is required. In addition, the ignition lock according to the invention, in comparison with an ordinary ignition lock, requires less space, which means more flexible configuration of the interior.

BRIEF DESCRIPTION OF THE DRAWINGS

The present invention is further explained below with reference to the appended drawing by means of preferred practical examples.

DETAILED DESCRIPTION

Figure 1:
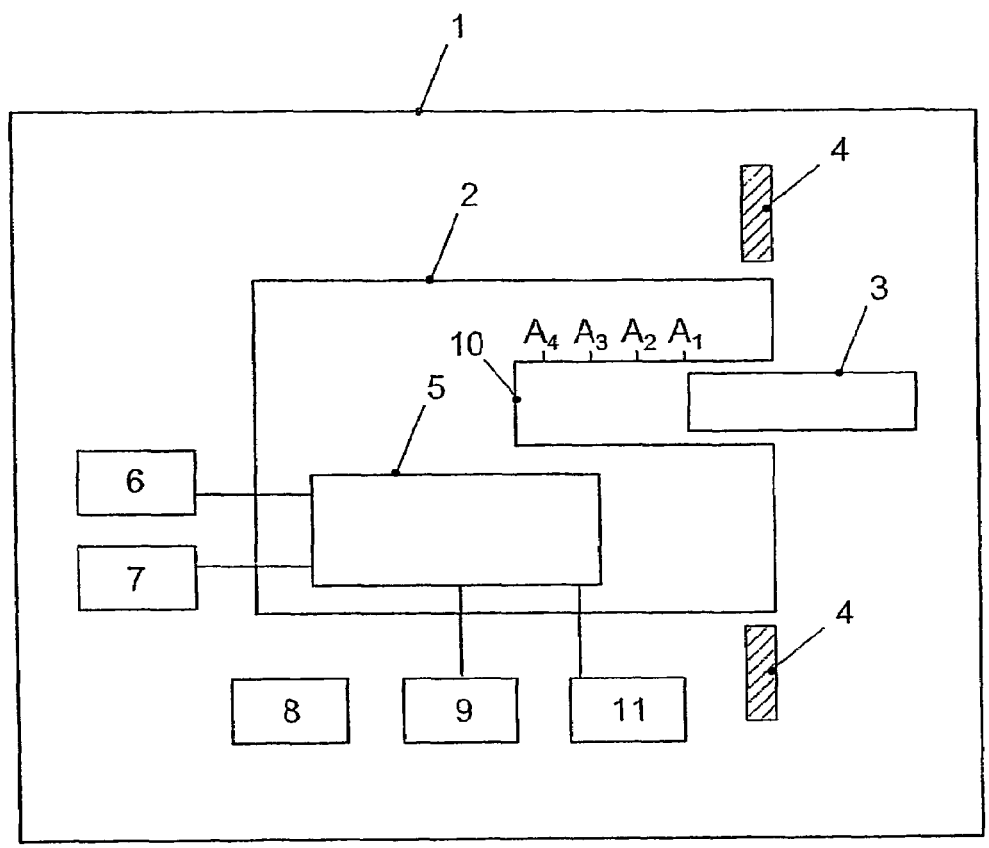
FIG. 1 shows a block diagram of the device for operation of the vehicle according to a preferred variant of the present invention.

A vehicle 1 is depicted schematically in FIG. 1, in whose ignition lock 2 an ignition key 3 is inserted to a position Al. The ignition lock 2 is arranged in a dashboard 4, so that it is closed off flush with it. The ignition lock 2 has a control 5, which monitors the position ($A_1$ to $A_4$), up to which the ignition key 3 has been inserted into a guide and holding system 10 of the ignition lock 2. The control 5 according to FIG. 1 controls power supply for electrical equipment, for example, a radio 6 or an air conditioner 11, activates and deactivates an immobilizer 7 and a steering wheel lock 8 and starts and stops an engine 9 of the vehicle.

Figure 2:
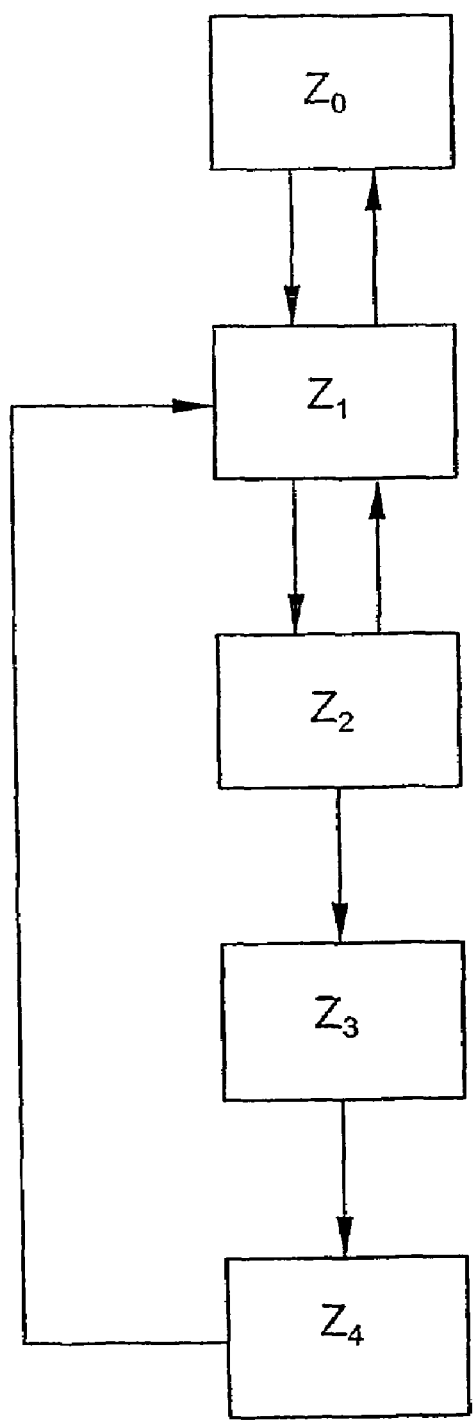
FIG. 2 shows the state transition diagram of the states of a control from FIG. 1.

States of control 5 and state transitions are shown in FIG. 2. If the ignition key is inserted up to position $A_1$ into the ignition lock 2, the control 5 goes from an initial state $Z_0$ to a state $Z_1$ (S contact). In state $Z_1$, the ignition key 3 can either be removed again, so that the control returns to state $Z_0$, or it can be pushed in beyond position $A_1$ to position $A_2$, in which the control 5 switches to state $Z_2$ (terminal 15). In state $Z_2$, the ignition key 3 can either be withdrawn to position $A_1$, so that the control returns to state $Z_1$, or it can be inserted beyond position $A_2$ and position $A_3$, up to position $A_4$, so that the control 5 is switched to state $Z_3$ (terminal 50). In state $Z_3$, the ignition key 3 can be released, so that the control 5 switches to state $Z_4$ (terminal 15 travel) and pushes the ignition key up to position $A_3$. In state $Z_4$, the ignition key 3 can be pushed again beyond position $A_3$, so that control 5 returns to state $Z_1$.

A stop can be provided in the ignition lock 2 at position $A_2$, which prevents the ignition key 3 from being pushed in one movement from position $A_1$ to position $A_4$.

In state $Z_0$, the ignition key 3 is situated outside of ignition lock 2 or is at least not pushed to position $A_1$. In this state $Z_0$, for example, the power supply of the electrical equipment 6 can be deactivated, the immobilizer 7 and steering wheel lock 8 activated, while the engine 9 is not running. In state $Z_1$, the power supply of some electrical equipment (for example, radio 6) can be activated and the immobilizer 7 and steering wheel lock 8 deactivated (mechanically or electronically), but the power supply of other electrical equipment (for example, the air conditioner 11) can be deactivated, while engine 9 is not running. In state $Z_2$, the power supply of the electrical equipment radio 6 and air conditioner 11 can be activated, the immobilizer 7 and the steering wheel lock 8 deactivated and all main consumers of the vehicle 1 engaged, while engine 9 is not running. In state $Z_3$, only the consumers, required for starting of engine 9, can be engaged, while the engine is started. In stage $Z_4$, the power supply of the electrical equipment radio 6 and air conditioner 11 can be activated, the immobilizer 7 and the steering wheel lock 8 deactivated and all main consumers engaged, while the engine 9 is running. In the transition from state $Z_4$ to state $Z_1$, the engine can be stopped. In state $Z_4$, the ignition key can be in a position, so that it protrudes no more than 2 mm from the ignition lock 2 so that, during an accident, there is no hazard of injury from the ignition key 3. This is of particular significance in countries with increased safety requirements in driving accidents.

In the transition from state $Z_4$ to state $Z_1$, the ignition key 3 is pushed (ejected) by control 5, so that the front part of the ignition key is situated in position $A_1$ and the ignition key 3 can be easily removed by the driver of the vehicle 1 from the ignition lock 2.

Figure 3:
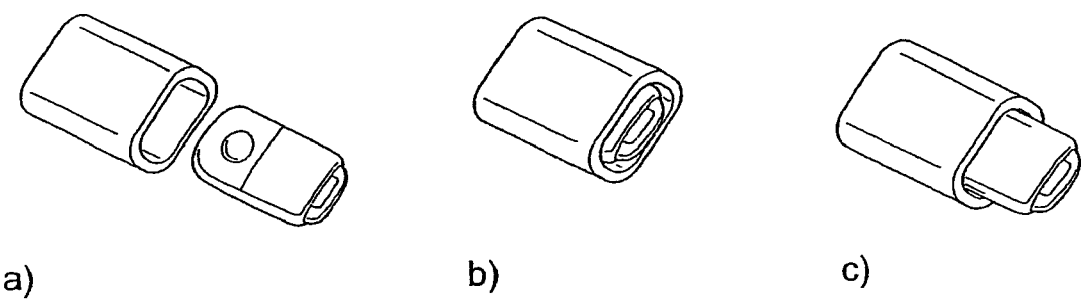
FIG. 3a to 3c show specific ignition key positions according to a preferred variant of the present invention.

FIG. 3a shows the ignition key 3 before insertion into ignition lock 2 (state $Z_0$). FIG. 3b shows the ignition key 3 during the starting process, i.e., the ignition key 3 is pushed beyond position $A_3$ to position $A_4$ into the ignition lock 2 (transition from the state $Z_3$ to state $Z_4$). FIG. 3c shows the ignition key 3 after the engine 9 has been stopped and the ignition key 3 has been injected (state $Z_1$).

In a high-priced vehicle equipped with "keyless-go" and "keyless-entry" systems, instead of ignition key 3, an adaption module (key-dummy) can be introduced to ignition lock 2, which is connected to the ignition lock 2 after the first introduction (generally at the plant) via a snap-in connection. The adaption module should be connected to the ignition lock so that it can only be removed by authorized persons (technical personnel). The ignition lock 2, with the introduced adaption module, can be used as a start/stop system. For this purpose, the control 5 can be coupled to a radio receiver calibrated to a corresponding radio signal. As soon as the radio receiver receives this corresponding radio signal and control 5 is in state $Z_0$, the control switches to state $Z_1$. If the control 5 is in state $Z_1$ and the radio receiver receives no corresponding radio signal with in a certain time interval, the control 5 switches back to state $Z_0$. The corresponding radio signal is emitted from a device carried by an authorized driver of vehicle 1.

By using the key-dummy, the production of vehicles 1 with "keyless-go" and "keyless-entry" systems is very similar to production of vehicles 1 without "keyless-go" and "keyless-entry" systems, which means an advantage in terms of production. The only difference is that in vehicles 1 with "keyless-go" and "keyless-entry" systems, instead of ignition key 3, an adaption module is introduced to the ignition lock 2.

In a preferred variant of the "keyless-go" and "keyless-entry" systems just described, the states $Z_1$ and $Z_2$ are combined to a new state $Z_{12}$. In state $Z_{12}$, all devices can be activated and deactivated that are also activated or deactivated in both $Z_1$ or $Z_2$. The state transitions $Z_0 \rightarrow Z_1$, $Z_1 \rightarrow Z_0$, $Z_2 \rightarrow Z_3$, $Z_4 \rightarrow Z_1$ are replaced by the state transitions $Z_0 \rightarrow Z_{12}$, $Z_{12} \rightarrow Z_0$, $Z_{12} \rightarrow Z_3$, $Z_4 \rightarrow Z_{12}$, while the state transitions $Z_1 \rightarrow Z_2$ and $Z_2 \rightarrow Z_1$ drop out.

LIST OF REFERENCE NUMBERS

1 Vehicle
2 Ignition lock/Key receptacle
3 Ignition key
4 Dashboard
5 Control
6 Electrical equipment (radio)
7 Immobilizer
8 Steering wheel lock
9 Engine
10 Guide and holding system
11 Electrical unit (air conditioner)
$A_1$ First position
$A_2$ Second position
$A_3$ Third position
$A_4$ Fourth position
$Z_0$ Initial state "prelock"
$Z_1$ State "S contact"
$Z_2$ State "terminal 15"
$Z_3$ State "terminal 50"
$Z_4$ State "terminal 15 travel"

What is claimed is:

1. A method for operating of a vehicle, comprising the steps of:
   inserting an ignition key to a first insertion position in a key receptacle, in which an operating state is in a first state, and
   if the operating state is in the first state, reaching a second state by further insertion of the ignition key up to a second insertion position, wherein an engine of the vehicle is started in the second state,
   if the operating state is in the second state, reaching a third state by releasing the ignition key, so that the ignition key is pushed to a third position, and
   if the operating state is in the third state, reaching a fourth state of the operating state by re-insertion of the ignition key, wherein the engine is stopped during a transition from the third state to the fourth state,
   wherein during a transition from the fourth state to the first state, the power supply of at least one electrical unit of the vehicle is activated, and during a transition from the first state to the fourth state, the power supply of the at least one electrical unit of the vehicle is de-activated,
   wherein in the first state the ignition key can be withdrawn to a fourth position to reach the fourth state, and
   wherein in the fourth state the ignition key can be removed from the key receptacle.

2. A method according to claim 1, wherein during insertion of the ignition key to the first position, starting from an initial state, the operating state passes through the fourth state, in which the engine is stopped before it reaches the first state.

3. A method according to claim 2, wherein during a transition from the initial state to the fourth state, an immobilizer and a steering wheel lock of the vehicle are deactivated and a power supply of at least one electrical unit of the vehicle is activated, and during the transition from the fourth state to the initial state, the immobilizer of vehicle and a steering wheel lock of vehicle are activated and the power supply of at least one electrical unit of vehicle is deactivated.

4. A device for operation of a vehicle comprising:
   a key receptacle for insertion of a ignition key comprising a plurality of insertion positions,
   control means operable to assume a plurality of operating states; and
   means for recording the position of the ignition key in the key receptacle,
   wherein the control means recognize whether the ignition key has been inserted to a first position, in which said control means assume a first state only by insertion up to the first position,
   wherein, if the control means are in the first state and recognize that the ignition key has been pushed further to a second position, the control means assume a second state, in which the control means starts an engine of the vehicle,
   wherein, if the control means are in the second state and recognize that the ignition key has been released, so that the ignition key is pushed to a third position, the control means assume a third state, and
   wherein, if the control means are in the third state and recognize that the ignition key has been re-inserted, the control means assume a fourth state, in which the control means stop the engine of the vehicle during a transition from the third state to the fourth state,
   wherein the control means activate a power supply of at least one electrical unit of the vehicle during a transition from the fourth state to the first state and de-activate the power supply of the at least one electrical unit of the vehicle during a transition from the first state to the fourth state,
   wherein, if the control means are in the first state, the ignition key can be withdrawn from the key receptacle to a fourth position, whereby the control means assume the fourth state, and
   wherein, if the control means are in the fourth state, the ignition key can be removed from the key receptacle.

5. A device according to claim 4, wherein during insertion of the ignition key to the first position starting from an initial state, the control means first passes through a fourth state.

6. A device according to claim 4, wherein the control means, when in the fourth state, deactivate an immobilizer and a steering wheel lock of vehicle and activates a power supply of at least one electrical unit of the vehicle.

7. A device according to claim 4, wherein the key receptacle is arranged in a dashboard and the ignition key protrudes no more than 2 mm from the dashboard when in the third position.

8. A device according to claim 4, wherein the key receptacle pushes the ignition key during transition from the third state into the fourth state, so that the front part of the ignition key is situated in a fourth position.

9. A device according to claim 8, wherein the fourth position is chosen, so that the ignition key protrudes no more than 3 cm from a dashboard.

10. A device according to claim 4, wherein the ignition key is mounted on the key receptacle.

11. A device according to claim 4, wherein the control means is coupled to a radio receiver and the control means reaches the first state as soon as the radio receiver receives a corresponding radio signal if the control means are in an initial state, and that the control means, if in the first state, switch to the initial state if a corresponding radio signal is not received in a specified time interval.

12. A device according to claim 11, wherein the fourth and first state are combined.

\* \* \* \* \*